UNITED STATES PATENT OFFICE.

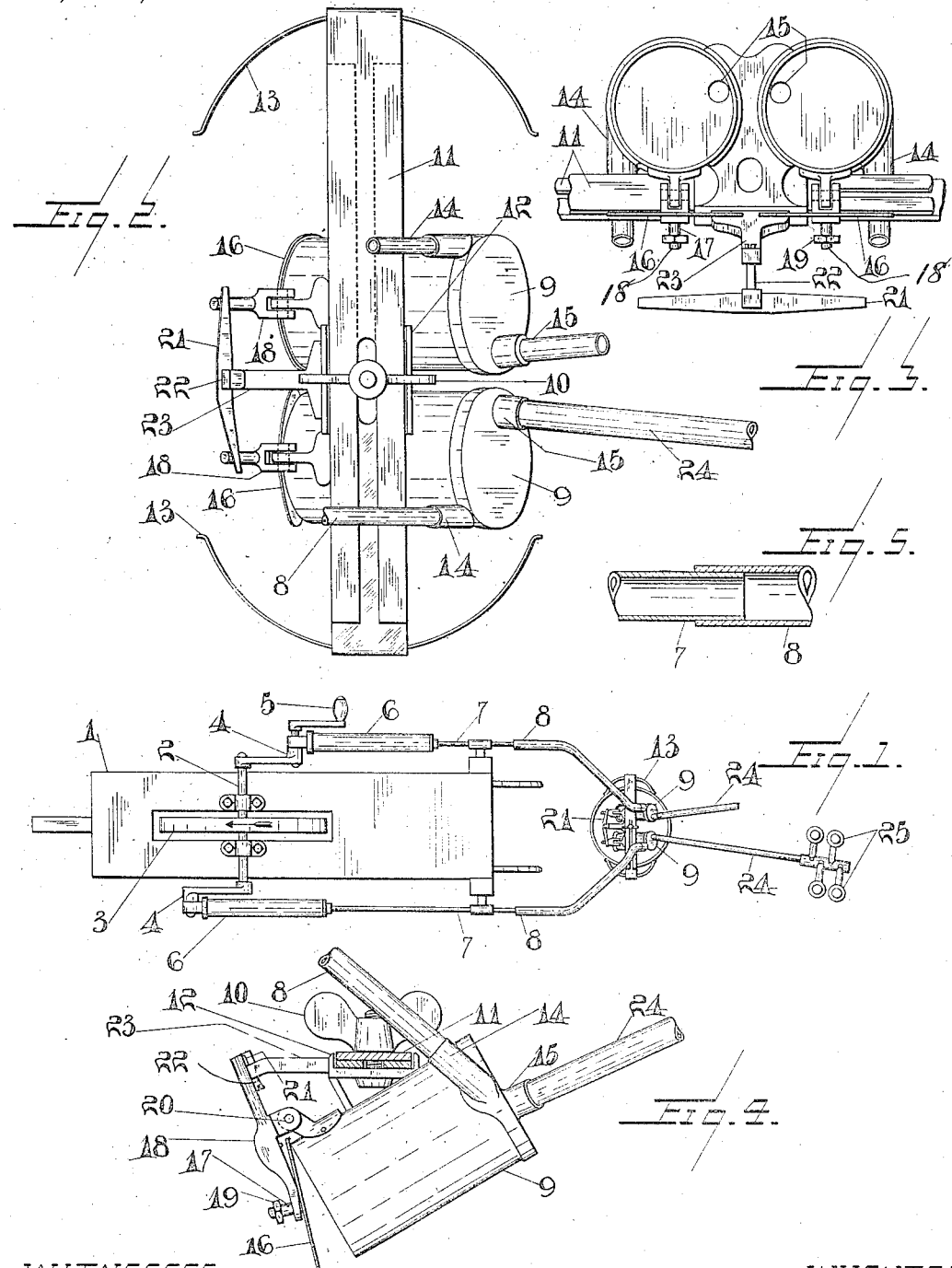

WALLACE C. BROWN, OF TORONTO, ONTARIO, CANADA.

MILKING-MACHINE.

1,163,808.  Specification of Letters Patent.  Patented Dec. 14, 1915.

Application filed August 19, 1914. Serial No. 857,578.

*To all whom it may concern:*

Be it known that I, WALLACE C. BROWN, of the city of Toronto, in the county of York, Province of Ontario, Canada, a subject of the King of Great Britain, have made certain new and useful Improvements in Milking-Machines, of which the following is a specification.

This invention relates to milking machines of the type in which a valve closed milk chamber receives the milk drawn from the cow and from which the milk is discharged when suction ceases, and my object is to so construct the apparatus that the normal tendency is for the valve of the milk chamber to open so that the milk may be discharged with the utmost freedom and to otherwise construct the apparatus to avoid any possibility of milk being drawn into the air tubes and to permit of its being easily cleaned.

I attain my objects by means of the constructions hereinafter described and illustrated in the accompanying drawings in which—

Figure 1 is a plan view showing the milking apparatus constructed in accordance with my improvements; Fig. 2 is a plan view on an enlarged scale of the milk chambers; Fig. 3 is a front elevation in inverted position of the milk chambers with the outlet valves opened wide to admit of the interiors of the chambers being cleaned; Fig. 4 a side elevation of the milk chambers; and Fig. 5 a detail showing the joint between one of the air tubes and the hollow piston rods of one of the pumps.

In the drawings like numerals of reference indicate corresponding parts in the different figures.

1 is the framework on which the pump is supported. The air pump comprises a shaft 2 suitably journaled on the frame and provided with the fly wheel 3. Cranks 4 are formed at opposite ends of the shaft 2, and one crank has an operating handle 5 secured thereto. The cranks are set opposite one another and are pivotally connected with the cylinders 6. The piston rods 7 are hollow and to them are connected the lines of pipe 8 leading to the milk chambers 9. The piston rods are pivotally connected with the frame as shown so that the pistons and cylinders rock on the pivots when the air pump is in operation. The interior construction of the pistons and cylinders is not shown as this may be of any well known form, no valves being employed.

A separate milk chamber is provided for each air pump. These milk chambers are attached together and are secured by means of the clamp bolt and nut 10 to the slotted bars 11 which slide on the bolt and between the lips 12 formed on the cast connection between the milk chambers. The ends of the bars 11 carry the curved springs 13 which are adapted to grip the rim of the pail. By adjusting the slotted bars 11 the milk chambers may be secured on pails of different diameters.

Each milk chamber is formed of a cylindrical tube downwardly inclined as shown particularly in Fig. 4. The lower end of each chamber is open and forms a discharge outlet. The upper end of each chamber is closed. The pipe 8 leading from the air pump is connected with the air outlet pipe 14 which opens into the milk chamber near its upper end and substantially tangential to the curved inner surface thereof. The air outlet pipe is also preferably inclined to the head of the milk chamber as shown particularly in Fig. 3. The milk inlet tube 15 extends through the end of the chamber and is inclined to direct the entering stream of milk against the side of the chamber opposite to the opening of the air outlet pipe 14. This milk inlet tube is also preferably directed to discharge somewhat upwardly relative to the axis of the milk chamber. By this arrangement of the air outlet pipe and the milk inlet pipe I secure a complete separation of the air and milk so that practically no tendency exists for the entering milk to be sucked up into the air outlet pipe.

The outlet opening of the milk chamber is controlled by a valve which normally tends to open so that no obstruction lies in the way of the freest possible discharge of milk from the chamber. Each valve comprises a valve disk 16 provided with a stem 17 passing loosely through an opening in the lower end of the rock arm 18, and having a nut 19 screwed on its end to prevent its disengagement from the rock arm. This arrangement allows the disk to adjust itself to its seat on the end of the milk chamber without reference to any inaccuracy in the action of the rock arm.

The rock arm is pivotally connected at 20 to the upper side of the milk chamber. The upper ends of the rock arms extend up above the pivots and behind them is pivoted a walking beam 21. This walking beam is preferably of resilient material secured to a stem 22 which forms its fulcrum and has its bearing in a hole formed in the arm 23 formed on or connected with the connections between the milk chambers. The stem 22 is preferably split at its lower end so that the lower end may be expanded to prevent its accidental withdrawal from its bearing. This walking beam is so located that when one valve is closed, as shown in Figs. 1 and 4, the other is opened. The resiliency of the walking beam permits of the valve disk which is open being pressed still further open by the weight of milk issuing so that a very free exit is provided for the outflowing milk.

In operation it will be seen that a suction occurs alternately in the two milk chambers. The flow of milk from the milk chamber alternates with the periods of suction. Each time therefore that milk flows from a milk chamber the opening of the valve of the chamber closes the valve of the other chamber so that the full effect of the suction of the pump is obtained in drawing milk from the cow. The suction also serves to maintain the valve closed once it has been closed by the opening of the valve of the other milk chamber. With a limited opening of the valves permitted and the quick action of the air pump the valve of the chamber in which suction is taking place may close without extraneous aid, but this cannot be depended on and certainty of operation can only be obtained by connecting the valves by a walking beam or some equivalent therefor.

The milk inlet pipes 15 are connected by means of the pipes 24 with teat cups 25 which may be constructed as in my co-pending application No. 851,742.

If it be desired to get at the interiors of the milk chambers for cleaning purposes, the walking beam may be drawn out of the path of the rock arms 18 as shown in Fig. 3 when the valves will open sufficiently, if the milk chambers be turned upside down as shown.

From the above description it will be seen that I have devised milk chambers which will keep the outflowing air and the inflowing milk entirely separate and which will provide the freest possible exit from each milk chamber so that there is no possibility of milk being held in the chamber and sucked up by the pump as sometimes occurs with gravity closed outlets.

What I claim as my invention is:

1. In milking apparatus the combination of two milk chambers each provided with a milk inlet, an air outlet, a discharge opening, and a valve for the discharge opening normally tending to open; a connection between the valves of the two chambers whereby the opening of one moves the other toward the closed position; and means for producing a vacuum in said chambers alternately.

2. In milking apparatus the combination of two milk chambers each provided with a milk inlet, an air outlet, a discharge opening, and a valve for the discharge opening normally tending to open; a resilient connection between the valves of the two chambers whereby the opening of one moves the other toward the closed position; and means for producing a vacuum in said chambers alternately.

3. In milking apparatus the combination of two milk chambers each provided with a milk inlet, an air outlet, a discharge opening, and a hinged valve for the discharge opening normally tending to open; a walking beam fulcrumed between the two valves and engaging each, whereby the opening of one moves the other toward the closed position; and means for producing a vacuum in said chambers alternately.

4. In milking apparatus the combination of two milk chambers each provided with a milk inlet, an air outlet, a discharge opening and a hinged valve for the discharge opening normally tending to open and provided with a rock arm; a walking beam fulcrumed between the two valves and adapted to engage the rock arms, whereby the opening of one valve moves the other toward the closed position; and means for producing a vacuum in said chambers alternately.

5. In milking apparatus the combination of two milk chambers each provided with a milk inlet, an air outlet, a discharge opening and a hinged valve for the discharge opening normally tending to open and provided with a rock arm; a resilient walking beam fulcrumed between the two valves and adapted to engage the rock arms, whereby the opening of one valve moves the other toward the closed position; and means for producing a vacuum in said chambers alternately.

6. In milking apparatus the combination of two milk chambers each provided with a milk inlet, an air outlet, a discharge opening and a hinged valve for the discharge opening normally tending to open and provided with a rock arm; a walking beam suitably fulcrumed to rock and to be slid into or out of the paths of said rock arms, when in the path of said rock arms being adapted to engage the rock arms, whereby the opening of one valve moves the other toward the closed position; and means for producing a vacuum in said chambers alternately.

7. In milking apparatus the combination of a milk chamber having a valveless inlet and an outlet provided with a gravity actuated valve normally tending to open in combination with automatic means, other than the suction in the milk chamber, for imparting a closing movement to said valve when a vacuum is created in said milk chamber.

8. In milking apparatus the combination of a milk chamber having a valveless inlet and an outlet provided with a gravity actuated valve normally tending to open in combination with automatic means aiding the suction in the milk chamber in closing said valve when a vacuum is created in said milk chamber.

9. In milking apparatus the combination of a cylindrical inclined milk chamber closed at its upper end and having a valve controlled outlet opening at its lower end, an air outlet substantially tangential to the curved inner surface and located adjacent the upper end of the chamber, and a milk inlet adapted to discharge longitudinally of the chamber toward the outlet and against the curved inner surface opposite to the air outlet.

10. In milking apparatus the combination of a cylindrical inclined milk chamber closed at its upper end and having a valve controlled outlet opening at its lower end, an air outlet substantially tangential to the curved inner surface and located adjacent the upper end of the chamber toward which it is slightly inclined, and a milk inlet adapted to discharge longitudinally of the chamber toward the outlet and against the curved inner surface opposite to the air outlet.

11. In milking apparatus the combination of a cylindrical inclined milk chamber closed at its upper end and having a valve controlled outlet opening at its lower end, an air outlet substantially tangential to the curved inner surface and located adjacent the upper end of the chamber, and a milk inlet adapted to discharge longitudinally of the chamber toward the outlet and slightly upwardly against the curved inner surface opposite to the air outlet.

12. In milking apparatus the combination of a cylindrical inclined milk chamber closed at its upper end and having a valve controlled outlet opening at its lower end, an air outlet substantially tangential to the curved inner surface and located adjacent the upper end of the chamber toward which it is slightly inclined, and a milk inlet adapted to discharge longitudinally of the chamber toward the outlet and slightly upwardly against the curved inner surface opposite to the air outlet.

13. In milking apparatus the combination of a cylindrical inclined milk chamber having a valve controlled discharge outlet at its lower end, an air outlet at its upper end substantially tangential to the inner curved surface and a milk inlet through which milk enters remote from the air outlet and against the wall of the chamber.

14. In milking apparatus the combination of a milk chamber having a valveless inlet, an outlet provided with a gravity actuated valve normally tending to open, and a resilient support for said valve in its opening.

Toronto, Ont., this eighth day of August, A. D. 1914.

WALLACE C. BROWN.

In the presence of—
E. P. HALL,
L. LAW.